May 19, 1953     H. A. HOWELL ET AL     2,639,333
MAGNETIC RECORDER
Filed May 12, 1947     9 Sheets-Sheet 1
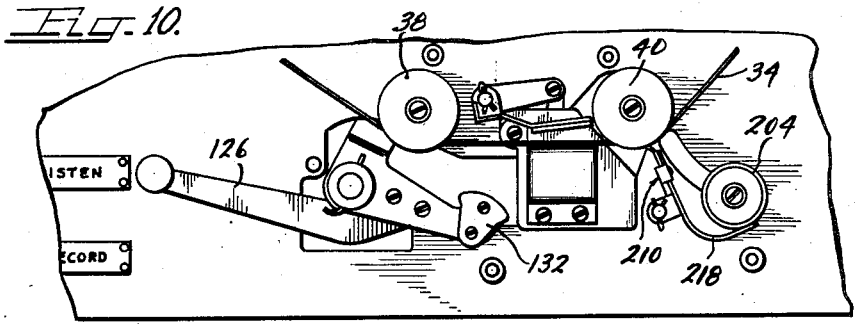
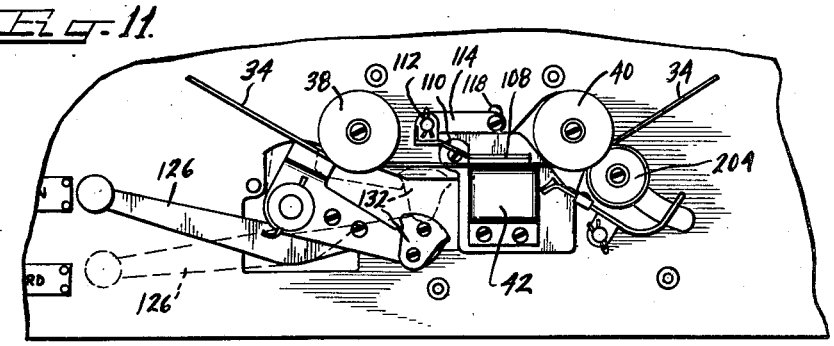
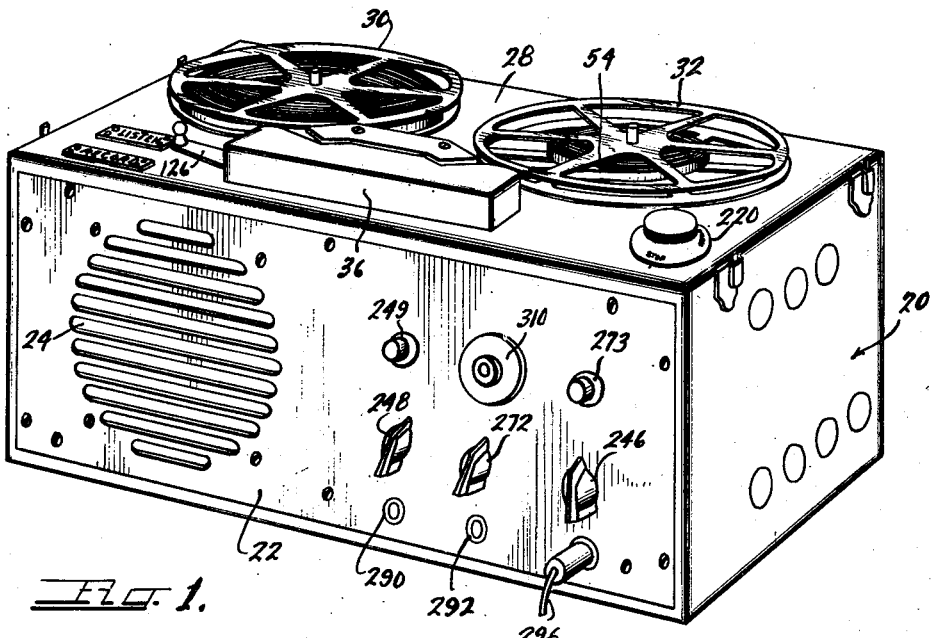
Inventors
Hugh A. Howell
Elmer B. Offutt

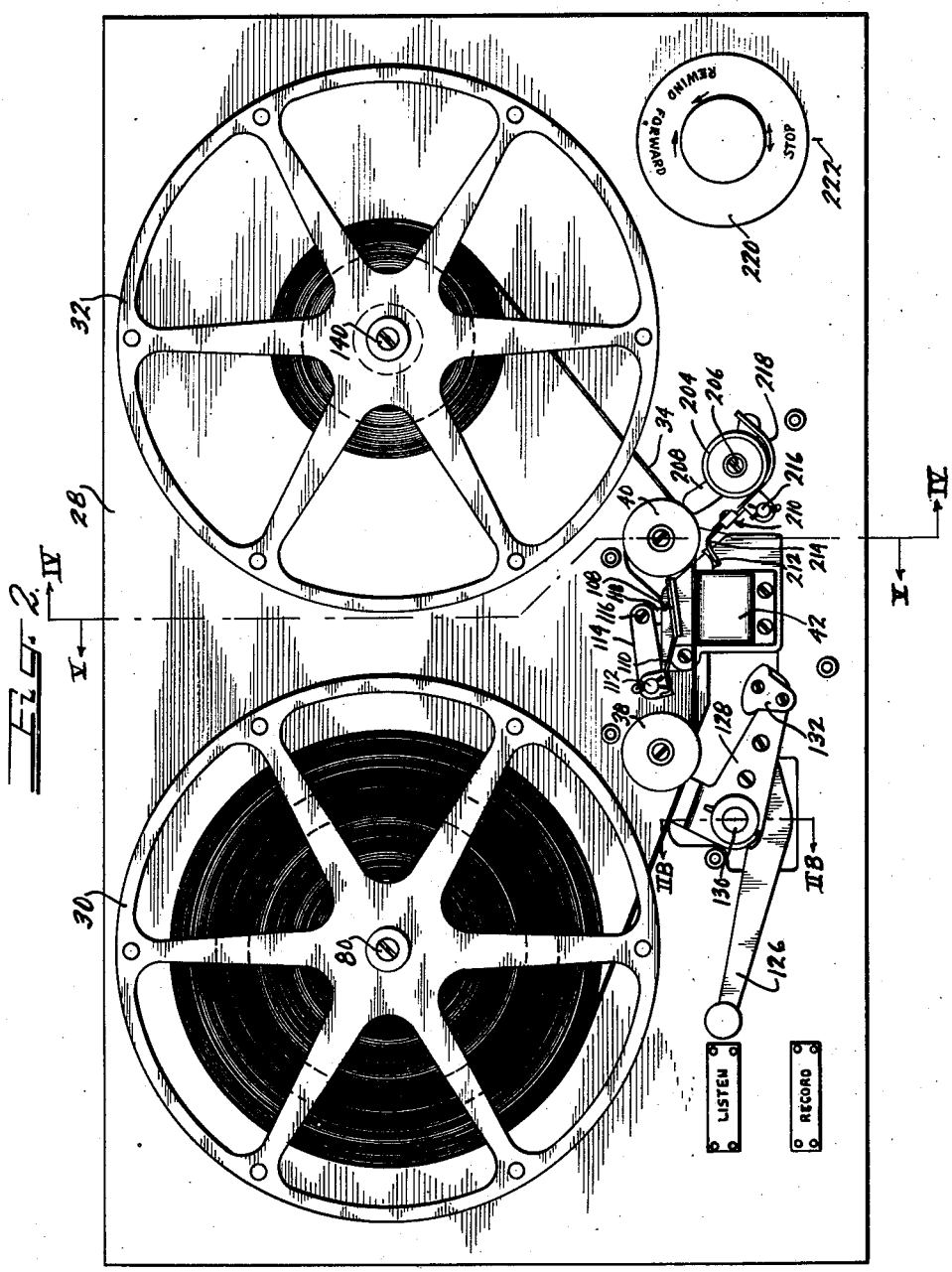

May 19, 1953  H. A. HOWELL ET AL  2,639,333
MAGNETIC RECORDER
Filed May 12, 1947  9 Sheets-Sheet 3
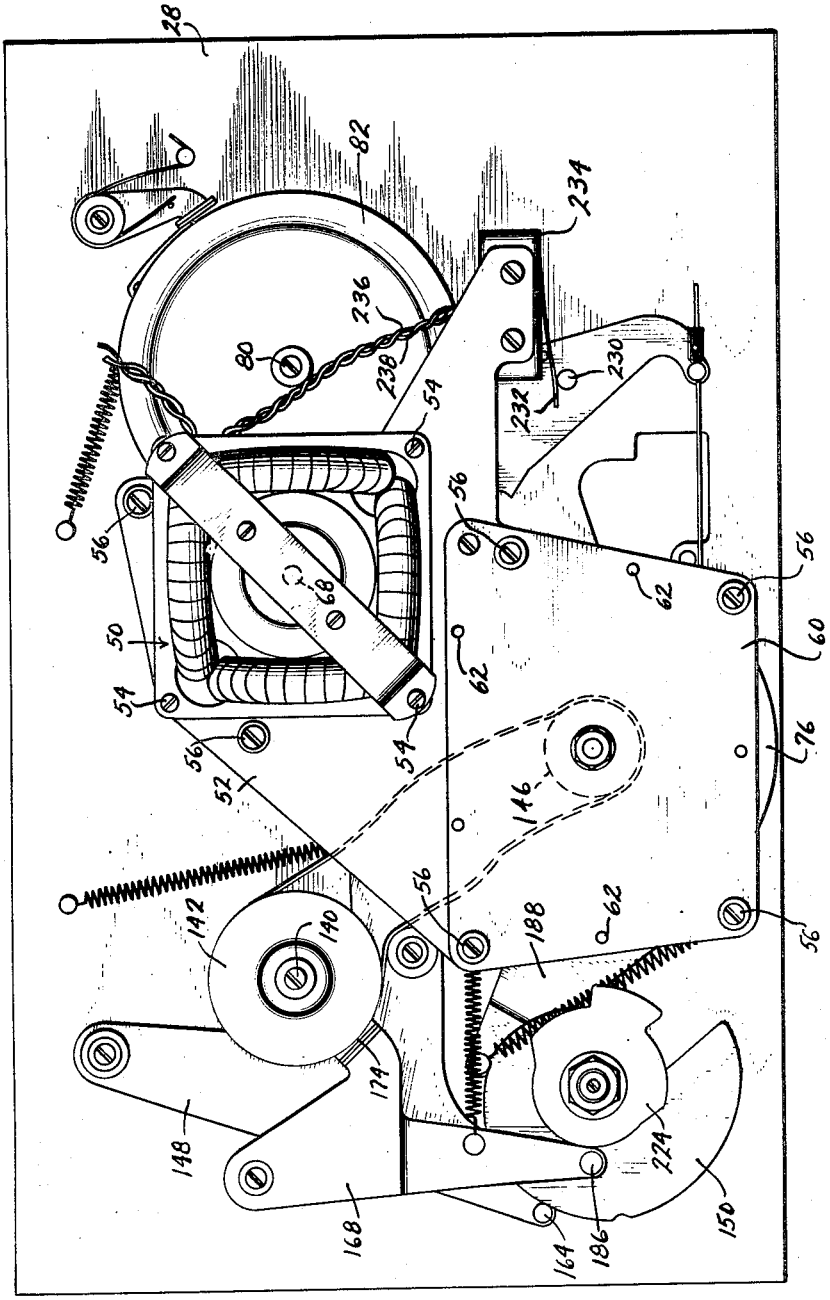
Inventors
Hugh A. Howell
Elmer B. Offutt
by The Firm of Charles W. Wills
Attys.

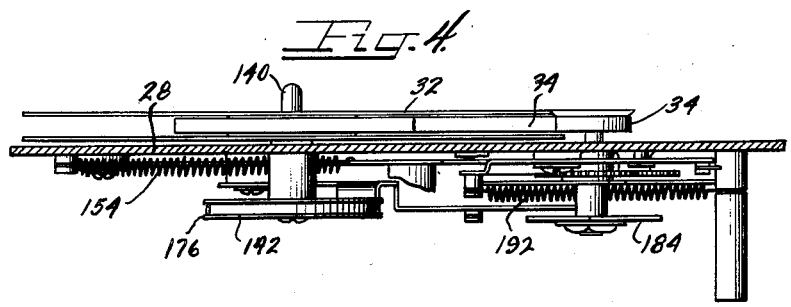
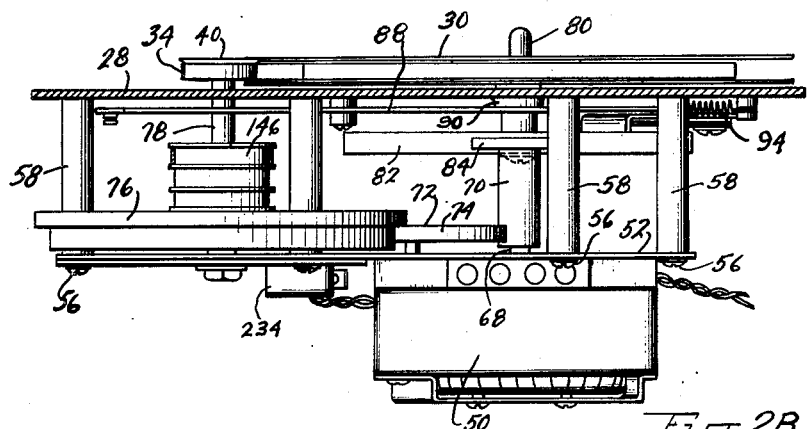
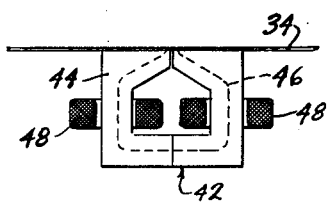
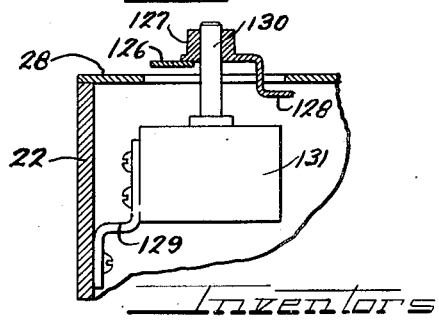
Inventors
Hugh A. Howell
Elmer B. Offutt May 19, 1953  H. A. HOWELL ET AL  2,639,333
MAGNETIC RECORDER
Filed May 12, 1947  9 Sheets-Sheet 5
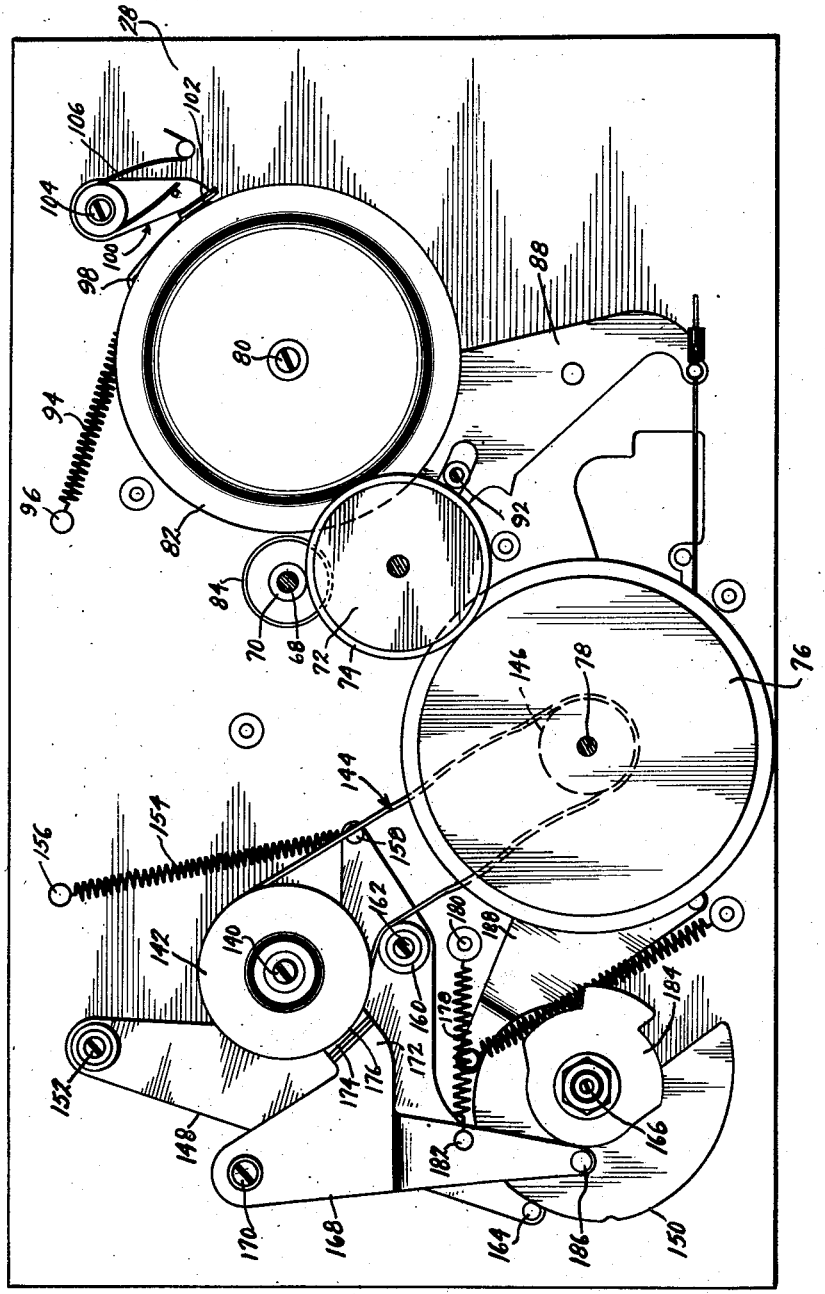
Inventors
HUGH A. HOWELL
ELMER B. OFFUTT
by
Attys.

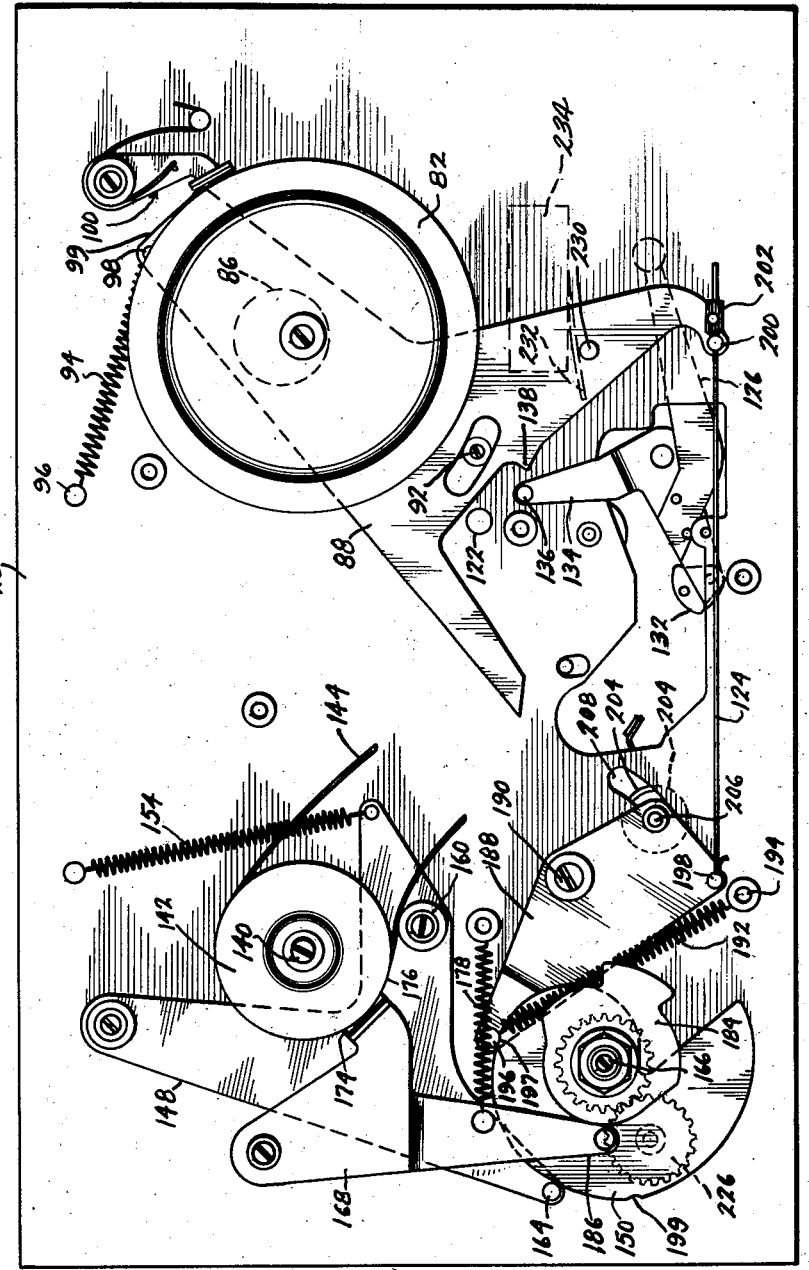

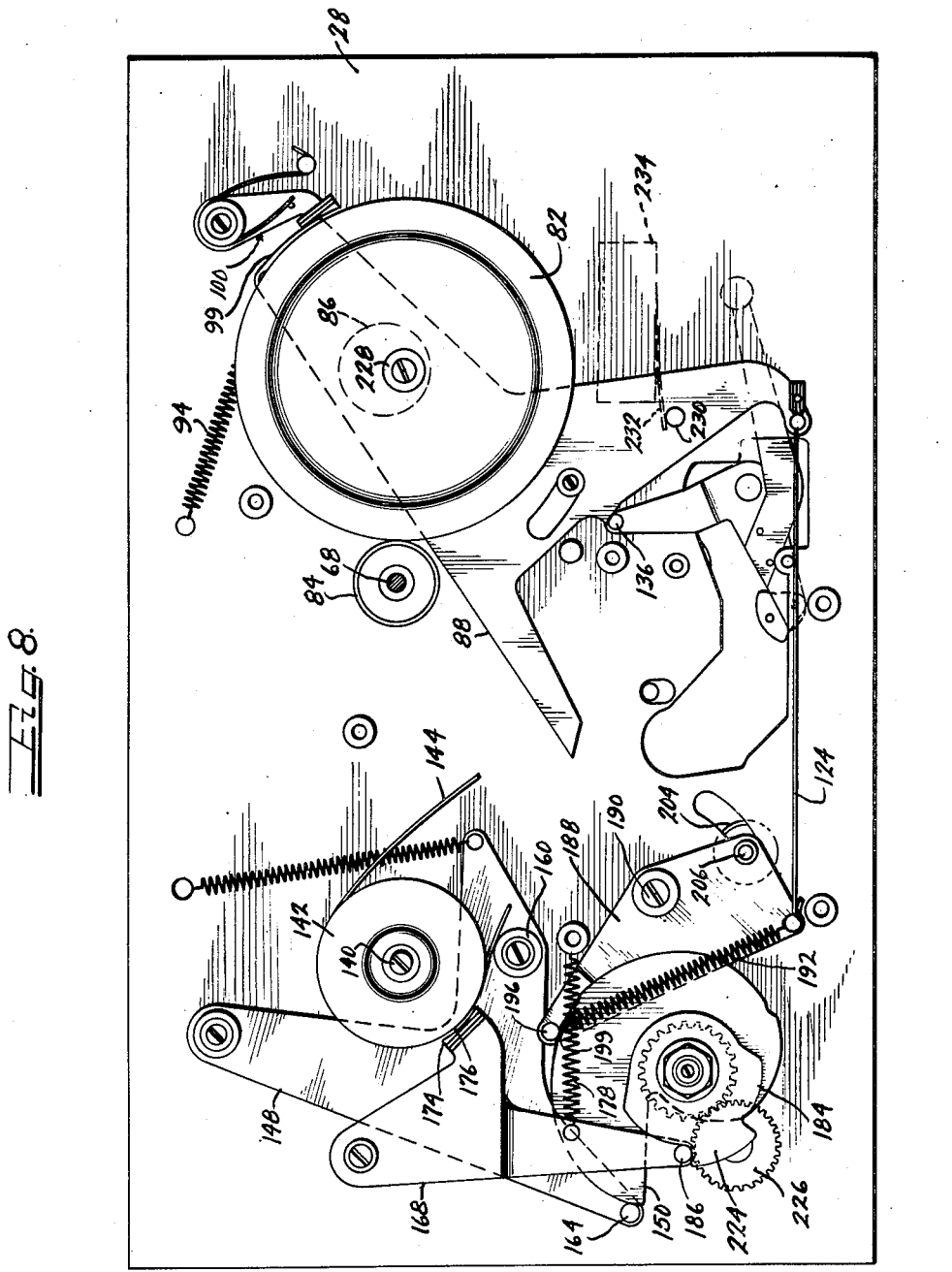

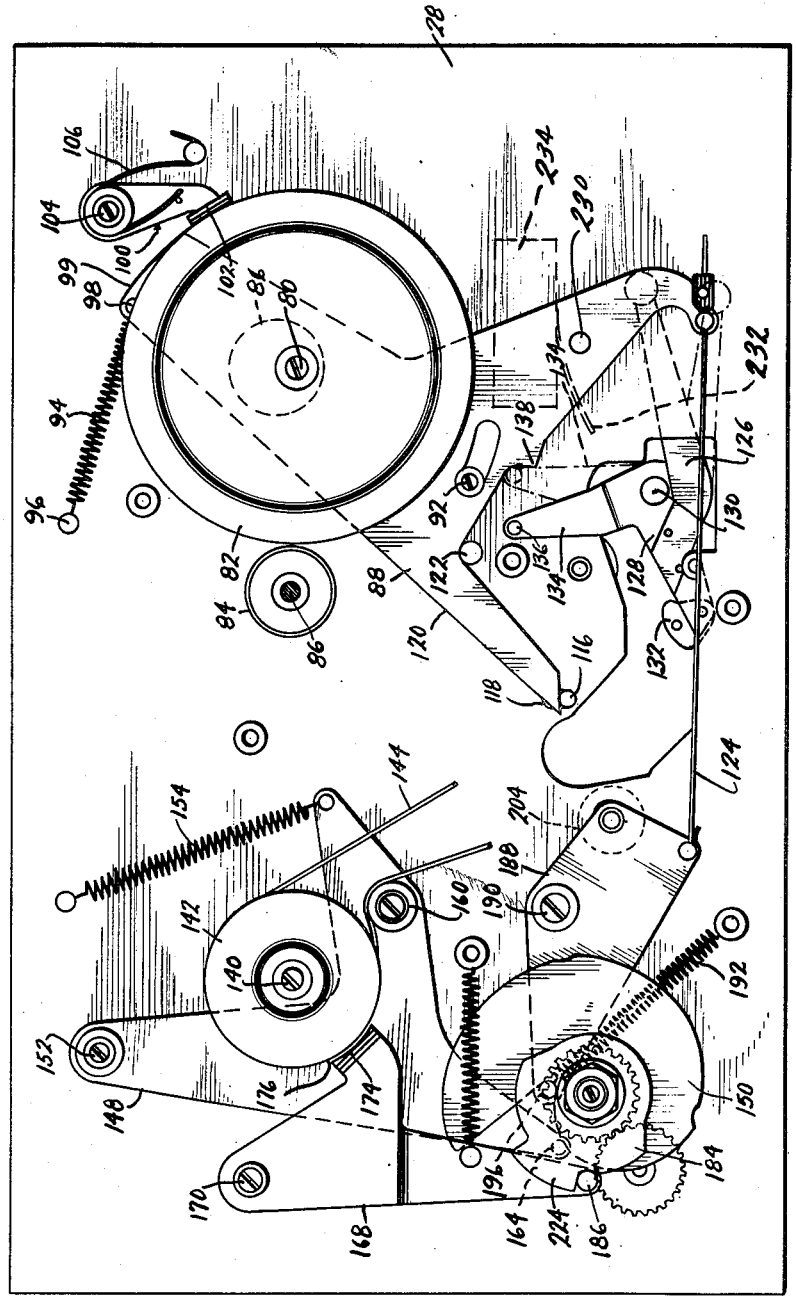

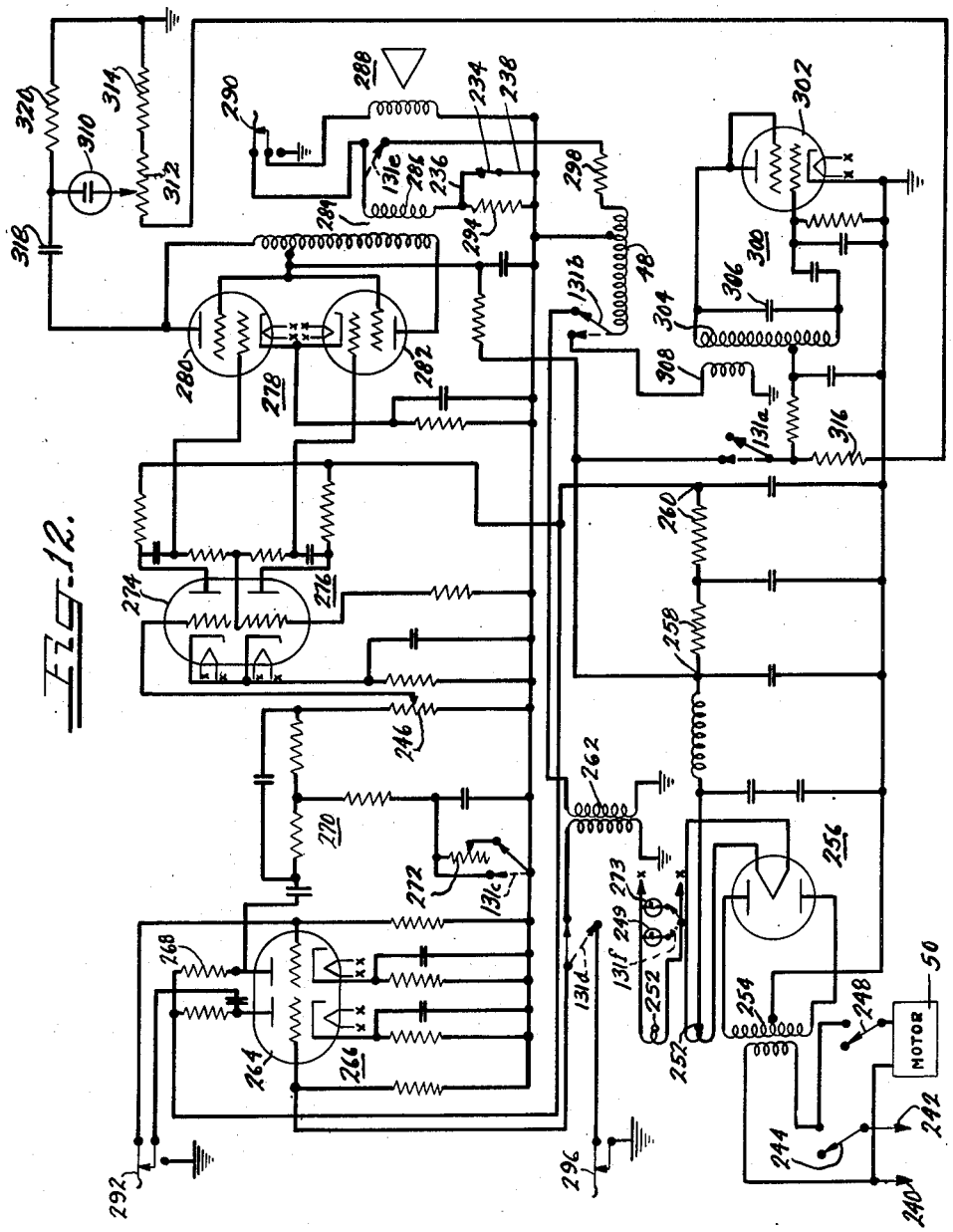

Patented May 19, 1953

2,639,333

UNITED STATES PATENT OFFICE 2,639,333

MAGNETIC RECORDER

Hugh A. Howell, Valparaiso, Ind., and Elmer B. Offutt, Kansas City, Mo., assignors to The Indiana Steel Products Company, Chicago, Ill., a corporation of Indiana Application May 12, 1947, Serial No. 747,540

11 Claims. (Cl. 179—100.2)

This invention relates to signal recording and reproducing mechanisms of the type wherein a medium is passed across a recording device at controlled linear velocity to record or reproduce a signal and has for its principal object the provision of an improved mechanism for the purpose of achieving the movements necessary for effecting recording and reproducing and most effectively interrelating these movements with the operation of the electrical portions of the equipment.

In recording intelligence, such as speech or music, by magnetic methods, a lengthy flexible magnetizable recording medium, such as paper tape bearing magnetic particles, is passed across a recording head at predetermined constant linear velocity. The recording head has a coil linking a magnetic flux path which passes in part through the medium and is connected to a source of current of value varying in accord with the intelligence to be recorded so that as the tape passes thereacross, variations in magnetization are imparted along the length of the medium. During the reproducing operation, the tape is passed at the same controlled linear velocity across a similar head and the resultant time varying electromotive force induced in the coil is applied to an amplifier or other device to reproduce the original intelligence in the form of audible music or the like.

The fidelity with which the intelligence is reproduced in a magnetic recorder is dependent on the degree to which the instantaneous linear velocity of the recording medium as it passes across the reproducing head during reproducing compares with the velocity at which it passed across the recording head during recording. Variations between these two velocities produce annoying and disturbing effects on the listener that reduce the enjoyment derived from the intelligence. In fact, this problem has become so significant in the art that the term "wow" has been applied to the annoying effects associated with periodic variations in the velocity of the medium.

It is accordingly an object of the present invention to provide an improved mechanism to impart controlled linear velocity to a medium so as to enable recording and reproducing operations without "wow" or other annoying effects.

Further, it is an object of this invention to provide an improved mechanism to impart controlled linear velocity to a medium, which velocity is maintained constant regardless of the amount of medium on each of the storage spools upon which it is wound so as to achieve a uniform degree of excellence in recording and reproducing.

During recording operations with a magnetic or similar type recorder it is desirable to erase undesired noise or intelligence before the medium passes over the recording head, as, for example, by imparting a uniform degree of magnetization to the medium. During rewinding and reproducing operations, however, it is essential that the erasing mechanism be inoperative as otherwise accidental erasure of a good recording might result. It is accordingly a further object of the present invention to provide an improved magnetic recorder wherein the erase mechanism is rendered inoperative during reproducing and rewinding operations so as to prevent accidental erasure of good recordings.

Further it is an object of this invention to provide an improved recording mechanism wherein the erase device is automatically rendered inoperative except during actual recording.

It is yet another object of the present invention to provide an improved mechanism for imparting uniform linear velocity to a medium for recording or reproducing purposes and which has features of construction, combination and arrangement whereby it may be constructed of simple stamped sheet metal parts, such as plates, to the end that it is inexpensive in construction, and simple and reliable in operation and has maximum utility for home use.

Further it is an object of the present invention to provide an improved mechanism capable of selectively transferring a lengthy medium in either of two directions but which may be driven from a unidirectional motor.

Still another object of the present invention is to provide an improved device for reproducing intelligence recorded on a medium, which device is adapted to rewind the medium without causing undesired and annoying high intensity "reverse" signals.

Yet another object of the present invention is to provide an improved device for reproducing or recording an intelligence on a lengthy magnetic medium wherein means are provided to cause the medium to ride at a predetermined point across the recording or reproducing head so as to have a constant position relative to the magnetic structure thereof and provide maximum fidelity of recording and reproduction.

Still another object of the present invention is to provide an improved recording and reproducing mechanism wherein interlocked shiftable elements automatically position the various portions of the mechanism for the various recording, reproducing, and rewind operations.

Further it is an object of the present invention to provide an improved recording and reproducing mechanism suitable for use with a lengthy magnetizable medium which may be operated to record, reproduce or rewind by manipulation of simple, foolproof, controls and without rethreading the medium.

The novel features which we believe to be characteristic of our invention are set forth with particularity in the appended claims. Our invention, itself, however, both as to its organization and method of operation, together with further objects and advantages thereof, may best be understood by reference to the following description taken in connection with the accompanying drawings.

On the drawings:

Figure 1 is an isometric view of the front panel and top portion of a magnetic recorder embodying the features of our invention.

Figure 2 is a top plan view of the recorder of Figure 1, but with the housing covering the head and associated elements removed.

Figure 2A is a diagrammatic view of the head showing the shape thereof and the positioning of the magnetizable tape relative thereto.

Figure 2B is a fragmentary cross sectional view through section IIB—IIB, Figure 2, and showing the switch and supporting elements associated with the listen-record operating arm.

Figure 3 is a view of the winding mechanism of the recorder of Figures 1 and 2 as seen when looking upward from a position directly below the support panel with the operating knob positioned in the "stop" position.

Figures 4 and 5 are cross section views taken along axes IV—IV and V—V, Figure 2, respectively, but not showing the head, erase magnet and elements associated therewith.

Figure 6 is a view like Figure 3, except that the drive motor and the supporting plate therefor are removed to show more clearly the operative elements hidden from view in Figure 3.

Figure 7 is another view like Figure 6, but with the flywheel and drivewheel removed to show clearly the portions of the mechanism hidden from view by these elements.

Figure 8 is a view like Figure 7, but showing the elements of the driving mechanism positioned for the rewind operation where the medium is caused to travel in direction opposite to the direction of travel during the recording or play-back operation.

Figure 9 is a view like Figures 7 and 8, but showing the elements of the drive mechanism positioned for the forward operation where the medium travels in direction for recording or play-back.

Figures 10 and 11 are fragmentary top views like Figure 2 but showing the position of the capstan and its associated elements when the medium travels in the rewind and the forward directions respectively.

Figure 12 is a schematic diagram of the electrical circuits employed in an embodiment of our invention and shows the interconnecting switches between the mechanical system and the electrical system to achieve the new and novel features thereof.

As shown on the drawings:

Referring now to the general view of the embodiment of our invention as shown in Figure 1, a housing, shown generally at 20, is provided within which the electrical and mechanical operative elements of the unit are disposed and which has front panel 22 to support the speaker 24, electrical operating knobs 248, 272, and 246, jacks 290 and 292, etc. A top panel 28 is provided to support the mechanical system, including the elements shown in Figures 1 and 2 supported above the panel and the elements shown in Figures 3 to 9 supported below the panel.

Above panel 28 are mounted medium supporting devices 30 and 32. A lengthy flexible recording medium 34 is coiled on these devices, so that upon rotation of devices 30 and 32 in like direction, medium 34 is passed between them. In traveling between devices 30 and 32, medium 34 passes within enclosure 36 where it travels across head 42, Figure 2, which converts the variations in magnetization along the length thereof to corresponding variations in a signal or, conversely, imparts variations in the magnetization of medium 34 along the length thereof in accord with the time variations of a signal.

The medium 34 may, for example, be a paper tape treated so as to be magnetizable. In one method of this treatment, a magnetizable coating is placed on the tape by drawing it through a suspension of magnetic particles so that particles are deposited on the tape and act as a magnetizable medium in connection therewith.

The operative elements which act upon medium 34 as it passes between devices 30 and 32 are shown most clearly in Figure 2 which is a top view of the mechanism of Figure 1 but with the enclosure 36 removed. From this view it will be apparent that the medium passes across guide pulley 38 and capstan 40 and in traveling between these elements passes across head 42 with linear velocity corresponding to the rotational velocity of capstan 40.

The construction of head 42 is shown in somewhat diagrammatic fashion in Figure 2A. As will be evident from this view, the head includes a core member 44 which, together with medium 34, defines a path for magnetic flux as is indicated by the dashed line 46. In addition, head 42 includes coil 48 having turns to link the flux of core 44 and medium 34. During recording operations, a time varying current is caused to flow in coil 48 by means to be described in further detail hereafter, so as to set up magnetic flux within head 42 and the incremental length of medium 34 positioned immediately over the air gap thereof. As capstan 40, together with devices 30 and 32 cause medium 34 to travel across head 42 at a uniform linear velocity, this causes variations in the magnetization of medium 34 to be imparted along the length thereof so as to magnetize medium 34 to a varying degree in accord with the time variations in the intelligence to be recorded. During the play-back operation, an amplifier is connected to coil 48 in a manner described in further detail hereafter, and medium 34 passed across head 42 by reason of the action of devices 30 and 32, together with capstan 40. As successive incremental lengths of medium 34 are positioned over head 42, different values of magnetic flux link coil 48. This causes a time varying electromotive force to be induced in coil 48 in accord with the variations in the magnetization of medium 34 along the length thereof, thereby reproducing a time varying signal corresponding to the signal recorded on the medium.

The operative structure for transferring medium 34 between devices 30 and 32 is shown in the views of Figures 2 to 11. Figure 3 is a view of the mechanism as seen looking upward from below panel 28 and shows all the elements mounted thereon in connection with the mechanism.

Power for rotating devices 30 and 32 together with capstan 40 is derived from motor 50. This motor is attached to support plate 52 by screws 54. Plate 52 is mounted parallel to and in spaced relationship with panel 28 by screws 56 which act in conjunction with sleeves 58, Figure 5. Reinforcing plate 60 is attached to support plate 52 by rivets 62.

The shaft 68 of motor 50 extends upwardly to an enlarged section 70 which is in frictional engagement with drive wheel 72. This is best seen in Figure 5 which is a cross section view through the indicated cross section of Figure 3. Drive wheel 72 is provided with a peripheral tire 74 (seen best in Figure 6) so as to provide good frictional engagement with enlarged section 70 of drive wheel 72. Drive wheel 72 further rides against flywheel 76 so as to impart rotational velocity thereto.

As is best seen in Figure 5, flywheel 76 and capstan 40 are mounted upon a common shaft 78 so that as rotational motion is imparted to flywheel 76, shaft 78 and capstan 40 are rotated accordingly. Thus linear motion is imparted to medium 34 in accord with the angular velocity of flywheel 76.

In addition to acting as part of the drive to rotate capstan 40 in accord with the rotational motion of shaft 68 of motor 50, flywheel 76 acts as an inertia device to maintain constant the angular velocity of capstan 40. This flywheel is constructed with relatively great diameter and has a relatively heavy outer periphery so as to provide maximum moment of inertia to oppose any influences tending to vary the rotational velocity thereof. These influences thus cause slippage in the drive mechanism as, for example, drive wheel 72, rather than variations in the linear velocity of medium 34. As described in further detail hereafter, medium 34 is urged against capstan 40 so as to prevent slippage between capstan 40 and medium 34 and cause flywheel 76 to maintain constant the linear velocity of medium 34. Inasmuch as the fidelity of reproduction of recorded signals depends upon the degree to which the actual linear velocity of medium 34 during the reproducing operation corresponds with the actual linear velocity of medium 34 during the recording operation, the constant velocities achieved in this fashion provide good fidelity of operation and a minimum tendency towards distortion, such as "wow."

Medium supporting device 30 is mounted on shaft 80, Figure 5, so as to rotate therewith. This shaft also supports disk 82 which is of diameter to engage enlarged portion 84 of shaft 68. This engagement will be further evident from examination of Figure 6. Shaft 80, together with disk 82 and device 30, is supported from panel 28 by eccentric 86, Figure 7. This eccentric is rotatably mounted within panel 28 and in turn rotatively supports shaft 80. The point at which shaft 80 is supported from eccentric 86 is displaced from the center thereof so that as eccentric 86 is rotated the position of shaft 80 is shifted.

In order to rotate eccentric 86 and thereby shift shaft 80, plate 88 is attached to eccentric 86 by boss 90, Figure 5. Plate 88 is further supported by pin 92, Figure 7, which permits rotation of plate 88 about the center of rotation of eccentric 86. Spring 94, acting against fixed pin 96 in panel 28 and pin 98 in plate 88, biases plate 88 in the counterclockwise direction as seen in Figure 7, thereby tending to swing disk 82 to a spaced position relative to enlarged portion 84 of shaft 68 and preventing shaft 68 from imparting rotation to device 30. Disk 82 is shifted to this position in the view of Figure 9, which corresponds to Figure 7 but in which the elements are adjusted to cause travel of medium 34 in the forward direction. Moreover, spring 94 tends to shift disk 82 in direction to cause the peripheral surface of that disk to engage friction brake 100 and supplement the cam action of plate 88 against that brake.

Plate 88 is further shaped to provide a camming action selectively to engage brake 100 against the disk 82. In Figure 7, for example, where the elements are disposed in the stop position, plate 88 is positioned so that the cam section, indicated at 99, is effective to space the brake 100 a small distance from the periphery of the disk 82 and thereby prevent any braking action. In Figure 8, where the plate 88 is rotated in the clockwise direction to a greater degree, the cam section 99 engages brake 100 to space that brake a greater distance. On the other hand when plate 88 is rotated in the clockwise direction as seen in Figures 7, 8 and 9, to the position of Figure 9, the cam section 99 swings free of brake 100 and the latter is effective to oppose rotation of disk 82.

In addition to shifting disk 82 into an engaging position relative to enlarged portion 84 of shaft 68 plate 88 actuates wiper 108, Figure 2, to press medium 34 against head 42 when the medium 34 is travelling in the forward direction across head 42. This action may best be understood by reference to Figures 2 and 9. As will be evident from Figure 2, wiper 108 is supported on leaf spring 110 which in turn is pivotally supported on pin 112 so that as pin 112 is rotated in the clockwise direction as seen in Figure 2, wiper 108 is swung into engagement with head 42. Arm 114 is likewise connected to pin 112 and has on its opposite end a downwardly extending pin 116 which may be seen projecting below panel 28 in Figure 9. An opening 118 is provided in panel 28 so as to permit movement of pin 116 to engage or disengage wiper 108. As will be evident from Figure 9, plate 88 is provided with an extending arm 120 of length to engage pin 116 so that as plate 88 is shifted about the axis of eccentric 86, pin 116 is engaged and wiper 108 swung into an engaging position to press medium 34 against head 42.

Pin 122, Figure 9, acts to engage plate 88 to limit the counterclockwise movement thereof associated with the action of spring 94 and causes plate 88 to assume the predetermined position shown in Figure 9 when wire 124 is not tensioned. In this position, disk 82 is swung out of engagement with enlarged portion 84 of shaft 68 and brake 100 is engaged to a degree sufficient to brake device 30 as necessary to maintain medium 34 taut as it is unwound from device 30, but insufficient to break medium 34.

In addition to the previously described functions, plate 88 acts in conjunction with arm 126, Figure 2, to prevent accidental erasure of medium 34 when playback or rewind operations are desired. To this end, arm 126 is attached to member 128 which in turn is keyed to shaft 130. This construction will be evident from Figures 2 and 9. Moreover, as will be seen in Figure 2, member 128 has an extending arm portion upon which permanent magnet 132 is mounted. This magnet acts as an erase magnet to impart a predetermined degree of magnetization to medium 34 as it passes thereover and hence removes undesired signals or noise previously imparted thereto. Moreover, member 128 has extending arm 134 which is located below panel 28 as may be seen in the view of Figure 9. Pin 136 is located at the remote end of this arm at a radius such as to be engaged by the projecting lip portion 138 of plate 88.

When arm 126 is in the listen position shown in Figures 2 and 9, erase magnet 132 is swung to a spaced position relative to medium 34 so that no magnetization is imparted to the medium by magnet 132 and no erasure of the record takes place. In this condition, pin 136 is swung free from the projecting lip 138 of plate 88 and is not engaged thereby, even when plate 88 is swung to the position shown in Figure 8 where it has maximum movement in the clockwise direction as seen from that figure.

When arm 126 is swung to the "record" position as shown in the dotted lines of Figures 9 and 11, medium 34 rides on magnet 132 so that a uniform degree of magnetization is imparted thereto as it passes thereover. In this condition the switch 131 of Figure 2B is rotated so as to connect the electrical system so as to impart a time varying current to head 42 in accord with the time variations in an intelligence to be recorded. Moreover, pin 136 on arm 134 (Figure 9) is swung to a position where it engages the extending lip 138 of plate 88. Inasmuch as plate 88 is in the position shown in Figure 9 when medium 34 is being unwound from device 30, no interference between arm 134 and plate 88 takes place, and it is possible to record the intelligence desired.

One of the features of our invention resides in the fact that the arm 126 is automatically returned to the listen position and magnet 132 spaced from medium 34 when the movement of medium 34 is stopped. This action takes place by reason of the engagement between pin 136 and lip 138. Thus if plate 88 is rotated in the counterclockwise direction as seen in Figure 9 so as to stop the unit, pin 136 is engaged by plate 88 so as to swing arm 126 to space erase magnet 132 relative to the medium 34 and prevent that magnet from affecting the medium.

Figure 2B is a fragmentary cross sectional view through the indicated cross section of Figure 2 and showing the method of supporting arm 126 relative to the top panel 28 and the front panel 22. As will be evident from this figure, arm 126 is supported on bushing 127 which is attached to shaft 130 so as to be supported thereby. Moreover, it will be evident that arm 128 extends below the surface of upper panel 28 as will be further evident from Figure 9. The shaft 130 is supported in switch 131 which is in turn supported from front panel 22 by bracket 129. The switch 131 is of conventional construction and includes at least six poles capable of moving in accord with the motion of arm 126 from the position shown in the solid lines of Figure 12 to the position shown in the dashed lines thereof.

Device 32 is supported from panel 28 by shaft 140, Figure 4. Pulley 142 is supported on shaft 140 and located below panel 28 so that rotation imparted to pulley 142 causes corresponding rotation of device 32. Pulley 142 is rotated in accord with the rotation of flywheel 76, Figure 5, by reason of belt 144, Figure 6, which rides on that pulley and on pulley 146 which is attached to shaft 78.

Inasmuch as pulley 142, Figure 6, is driven through pulley 146, wheel 72, and shaft 68, pulley 142 rotates in the same direction as shaft 68. Moreover, it will be evident that the direction of motion imparted to shaft 80 by section 84 of shaft 68 is opposite to the direction of rotation of shaft 68. Furthermore, flywheel 76 rotates in the same direction as shaft 68 by reason of the action of wheel 72. Thus, if shaft 68 is rotated in the clockwise direction as seen in Figure 6, shaft 80 is rotated in the counterclockwise direction when disk 82 is engaged by enlarged section 84 so as to tend to wind medium 34 upon device 30. Moreover, flywheel 76 and capstan 40 are rotated in the clockwise direction as seen in Figure 6 so that the velocity tended to be imparted to medium 34 by the action of capstan 40 is in direction to transfer medium 34 from device 30 to device 32. In addition, pulley 142 and device 32 are rotated in the clockwise direction as seen in Figure 6 when belt 144 is engaged so as to tend to wind medium 34 upon device 32. Thus, one direction of rotation of shaft 68 corresponds to winding action on both device 30 and device 32. This winding action is controlled by selectively engaging the drive in a manner to be described in further detail hereafter.

It is the function of plate 148, Figure 6, to tension pulley 144 in accord with the position of cam 150, Figure 6. Plate 148 is pivotally mounted about pin 152 and is disposed below the surface of panel 28. Spring 154, acting against pin 156 in panel 28 and pin 158 on plate 148, tends to rotate plate 148 in the counterclockwise direction as seen in Figure 6, thereby swinging idler wheel 160 into engagement with belt 144 and tensioning that belt to achieve more effective driving action on pulley 142 by reason of the rotation of belt 144. Idler wheel 160 is rotatably mounted about pin 162 to minimize the frictional drag on belt 144 associated with the presence of the idler mechanism.

Plate 148 is positioned in accord with the angular position of cam 150 by reason of the engagement of pin 164 with the peripheral surface thereof. Spring 154 acts to swing plate 148 so that pin 164 engages cam 150 and cam 150 is provided with a varying radius about shaft 166 so that the tension of belt 144 is altered in accord with the angular position of cam 150.

It is the function of plate 168 to act as a brake selectively to oppose rotation of device 32. To this end, plate 168 is pivotally supported from panel 28 by pin 170 and is provided with arm 172 having friction wiper 174 to engage edge 176 of pulley 142 to retard shaft 140. Spring 178, acting against pin 180 on panel 28 and pin 182 on plate 168, tends to swing plate 168 in the counterclockwise direction about pin 170 as seen in the view of Figure 6, thereby tending to cause engagement of friction wiper 174.

It is the function of cam 184 to position plate 168 about pin 170 so as selectively to cause engagement of the friction wiper 174. To this end, pin 186 is located on plate 168 and is disposed so as to engage the peripheral surface of cam 184. Spring 178 biases plate 168 in a counterclockwise direction as seen in Figure 6 to cause engagement between pin 186 and cam 184. Thus as cam 184 is rotated and the radius between pin 186 and shaft 166 altered, plate 168 is swung about pin 170 so as to cause engagement and disengagement of the wiper 174 to increase or decrease the braking torque on shaft 140.

It is the function of plate 188, Figure 7, to shift pinch wheel 204 and plate 88 in accord with the rotation of cam 150. To this end, plate 188 is pivotally supported in spaced relationship with panel 28 by pin 190 and is biased in the counterclockwise direction about pin 190 by spring 192 which acts against pin 194 on panel 28 and pin 196 on plate 188. Pin 196 is located to engage the peripheral surface of cam 150 so that spring 192 causes pin 196 to engage cam 150 and thereby causes plate 188 to rotate about pin 190 in accordance with the rotation of cam 150 about the axis of shaft 168.

Interconnection between plate 188 and plate 88 is provided by flexible cord 124 which may, for example, be a wire. This cord is attached to plate 188 by pin 198 and to plate 88 by pin 200. Adjustable stop 202 is provided to enable alteration of the length of wire 124 between pin 198 and pin 200 so that the interconnecting relationship between plates 188 and 88 may be varied. Inasmuch as spring 94 tends to swing plate 88 in the counterclockwise direction as seen in Figure 7, wire 124 is maintained in a taut condition and rotation of cam 150 causes rotation of plate 88 about the center of eccentric 86 so as to shift disk 82 from the position wherein brake 100 is engaged (Figure 9), to a position where it is driven by enlarged portion 84 of shaft 68 (Figure 8).

In addition to interconnecting plate 88 and cam 150, plate 188 acts to position pinch wheel 204 in accord with the direction of travel of medium 34 so that the pinch wheel engages when medium 34 is desired to travel in the direction corresponding to the direction of rotation of capstan 40. To this end, pinch wheel 204 is rotatably mounted on shaft 206 which extends through opening 208 of panel 28 as will be evident from Figure 7. Opening 208 is shaped to permit movement of shaft 206 and plate 188 in accord with the movements of cam 150.

It is the function of the wiper assembly 210, Figure 2, to press medium 34 against capstan 40 when medium 34 passes across capstan 40 in opposition to the rotation thereof. To this end, a friction wiper, such as a felt pad, 212, is mounted upon spring support 214 which is in turn rotatably supported from panel 28 by pin 216. The opposite end 218 of support 214 is turned about idler wheel 204 so that as idler wheel 204 is swung to a spaced relationship with medium 34 the wiper assembly 210 is rotated into position to press medium 34 against capstan 40.

In accordance with the preferred embodiment of our invention, capstan 40 has a surface of soft material, such as lead alloy, so that as medium 34 is drawn across capstan 40 and pressed thereagainst by wiper 212 the surface of capstan 40 is polished to a uniform radius about the axis of rotation. This causes a uniform movement of medium 34 when velocity is imparted thereto by capstan 40, thereby avoiding any tendency toward "wow."

*Operation*

The operation of the mechanical portions of our invention can best be understood by reference to the views of Figures 7, 8 and 9, taken in conjunction with the views of Figures 2, 10 and 11. These views show the operating mechanism in the various operating positions.

In the view of Figure 7, the unit is in the "stop" position where the stop marking on dial 220 is aligned with the reference mark 222 of panel 28 as will be evident from Figure 2. In this condition, the radius arm of cam 184 which bears against pin 186 of plate 168 is of small value so that the spring 178 swings plate 168 against edge 176 of pulley 142 to cause wiper 174 to oppose rotation of that disk and hence to oppose rotation of device 32. Furthermore, pin 164 of plate 148 rides on a point of relatively great radius of cam 150 so that the biasing action of spring 154 is overcome and idler wheel 160 does not tension belt 144.

In the stop position of Figure 7, the cam section 99 of plate 88 acts to engage the brake 100 and swing that brake free of wheel 82. Thus disk 82 is free to rotate when the dial 220 is shifted from the rewind position to the stop position and there is no tendency for the device 30 to be stopped more rapidly than the medium 34 is released for winding thereon. Should device 30 be braked before device 32 when the dial 220 is shifted from the rewind to the stop position the medium 34 would be "spooled out" as the latter device would unreel the medium when the rotation of the former is inadequate to take it up.

Cams 150 and 186 are retained in the "stop" position against the action of springs 192, 94 and 154 by notch 197 of cam 150 in which pin 196 rests. This notch further indicates to the operator the fact that the "stop" position is reached. The spring 192, acting against the notch 197 causes cam 150 to lock in the "stop" position if knob 220 is rotated to a point very near that position and then released.

As will be evident from Figure 2, the pinch wheel 204 is swung to a disengaged position relative to capstan 40 when dial 220 is rotated to the "stop" position. This results from the fact that the pin 196, Figure 7, rides on a point on cam 150 having a radius which restricts the rotation of plate 188 by spring 192 to an amount insufficient to cause engagement of pinch wheel 204 with capstan 40. Thus, the frictional engagement between medium 34 and capstan 40 is only the frictional engagement associated with the presence of medium 34 thereon. This frictional engagement is inadequate to cause motion of medium 34 against the retarding action of the brake 174 which acts to oppose rotation of device 32 and to arrest motion of medium 34.

When the mechanism is in the "stop" position, of Figures 2 and 7, it is impossible to shift arm 126 from the "listen" position shown in Figure 2 to the "record" position shown in the dotted lines of Figure 11. This is due to the fact that rotation of arm 126 causes corresponding rotation of arm 134, Figure 7, which rotation swings pin 136 to engage the extending lip 138 of plate 88. This engagement prevents arm 126 from rotating sufficiently to swing erase magnet 132 into an engaging position with medium 34.

By the automatic action of plate 88 in preventing rotation of arm 126 to the "record" position, we avoid the possibility of accidentally erasing a recording. This results from the fact that at the end of any recording operation it is necessary to stop the mechanism, a movement that swings plate 88 to position of Figure 7 wherein arm 126 is swung to position magnet 132 to a spaced relationship relative to medium 34.

Figures 8 and 10 show the operating mechanism in the "rewind" position where medium 34 is wound from device 32 to device 30. In this condition, dial 220 is swung to the position wherein the "rewind" marking is opposite the reference mark 222, Figure 2. As will be evident from Figure 8, the pin 186 of plate 168 engages the extending portion 224 of cam 184, thereby preventing further rotation of dial 220 and gear 226. This advises the operator that the rewind position is reached and prevents turning dial 220 beyond the "rewind" position to the "forward" position.

In the rewind position, pin 186 rides on a portion of cam 184 having a relatively large radius so that the action of spring 178 is overcome and wiper 174 swings free of wheel 142. Furthermore, pin 164 of plate 148 rides on cam 150 at a point of relatively large radius so that idler wheel 160 swings free of belt 144 to cause that belt to ride loosely on pulley 142. Thus, there are neither braking nor driving torques exerted on shaft 140 and the medium 34 may be unwound therefrom without encountering opposition to rotation other than that associated with the friction inherent in the structure. It is thus possible to transfer medium 34 at relatively great velocity without excessive tension thereon.

From Figure 8 it will further be apparent that pin 196 of plate 188 rides on cam 150 at a point of relatively greater radius than the radius upon which it rides in the position of Figure 7. Thus, cam 150 overcomes the biasing action of spring 192 and cord 124 is tensioned to swing plate 88 in the clockwise direction in opposition to the biasing action of spring 94. As plate 88 is swung about the axis 228 of eccentric 86, the disk 82 is shifted away from brake 100 and against the enlarged portion 84 of shaft 68, as will be evident from Figure 8. Portion 84 of shaft 68 accordingly drives disk 82 to rotate device 30 in direction to wind medium 34 thereon.

The rotation imparted to device 30 is due to the driving engagement between disk 82 and the enlarged portion 84 of shaft 68. The relative diameters of these disks are chosen so as to achieve the desired linear velocity of medium 34 as it is transferred. In the preferred embodiment of our invention these diameters are chosen so that the rewind operation takes about one-tenth as long as the corresponding winding operation, thereby minimizing the time lost during rewind.

When the dial 220 is positioned in the "rewind" position shown in Figure 8, the rotation of plate 188 about pin 190 is sufficient to swing idler wheel 204 to the remote position relative to capstan 40 shown in Figures 8 and 10. In this position, idler wheel 204 bears against the extending arm 218 of wiper mechanism 210, thereby causing the wiper pad to engage medium 34 as it passes over capstan 40. Thus, as medium 34 is drawn over capstan 40 in opposition to the rotation thereof, the medium is pressed against the soft surface of capstan 40 and operates to polish that surface to a uniform radius. This automatically maintains capstan 40 in condition to impart a uniform linear velocity to medium 34 during the forward or wind operation. Certain features of this portion of the mechanism are described and claimed in the copending application of Elmer B. Offutt, Serial No. 747,556, filed May 2, 1947, now Patent No. 2,539,858, dated January 30, 1951, assigned to the same assignee as the present invention.

When plate 88 is moved from the "forward" position of Figure 9 to the "stop" position of Figure 7 and moved further to the "rewind" position of Figure 8, the pin 230 swings about the center of eccentric 86 to engage the extending arm 232 of switch 234. This disconnects wires 236 and 238, Figure 3, to insert a resistance in the circuit of the amplifier so as to reduce the volume of sound to a pleasing level during the rewind operation. Inasmuch as the sound produced during rewind is a "reverse" intelligence and of no value other than to indicate reversed operation and the intensity of this sound tends to be relatively great because of the high velocity of the medium over the head, this feature is of substantial importance in providing a mechanism of maximum usefulness in the home. The operation of switch 234 is described in further detail hereafter in conjunction with the electrical circuits employed in our invention.

When dial 220 is rotated to the "forward" position wherein the forward mark thereon is opposite reference mark 222, Figure 2, the operative elements of the mechanism are disposed as shown in Figures 9 and 11. This position is necessarily reached from the "stop" position because dial 220, Figure 2, is held against rotation from the "forward" position to the "rewind" position without first going through the "stop" position or from the "rewind" position to the "forward" position without going through the "stop" position. This is accomplished by extension 224, Figure 9, of cam 184 which engages the pin 186 of plate 168 to prevent such rotation. This feature not only reduces the wear on the equipment incident to the reversing of direction of travel of medium 34 and minimizes the tendency of the apparatus to tear or break the tape but also assures that erase magnet 132 is in a spaced position relative to medium 34 at all times other than during the recording operation. That is, since arm 126 is automatically swung to the position shown in Figure 2 when the dial 220 is turned to the "stop" position the action of the operator necessarily swings the erase magnet 132 to a spaced position when the record operation is stopped and the medium is rewound to the original spool. In the absence of this provision of our invention, it would be possible, for example, for an inexperienced operator to leave the erase magnet 132 against medium 34 after making a recording and as a consequence, causing erasure of the medium during the resultant rewind operation.

When the knob 220 is rotated to the forward position of Figure 9, the pin 186 rides on a relatively large radius of cam 184 so that plate 168 is rotated in the counterclockwise direction about pin 170 and the friction surface 174 is swung free of edge 176 of pulley 142. Moreover, pin 164 rides on a point of relatively small radius of cam 150 so that plate 148 is swung by spring 154 in the counterclockwise direction about pin 152. This swings idler 160 against belt 144 so as to tension that belt and cause a good friction drive between pulley 146, Figure 3, and pulley 142, thereby yieldably driving device 32 in the wind direction.

In the "forward" position pin 196 of plate 188 rides on a point of small radius of cam 150 so that spring 192 rotates plate 188 in the counterclockwise direction about pin 190 to a relatively great degree. This swings pinch wheel 204 into engagement with capstan 40 as shown in Figure 11 and at the same time releases wire 124 to permit spring 94 to swing plate 88 in the counterclockwise direction about eccentric 86. The engagement between medium 34 and capstan 40 due to the pressing action of pinch wheel 204 under the bias of spring 192 causes a relatively positive driving action between capstan 40 and medium 34 so that linear velocity is imparted to medium 34 in accord with the angular velocity of capstan 40. Inasmuch as capstan 40 is polished to a uniform radius by rewind operations and rotates at a substantially constant angular velocity by reason of the action of flywheel 76 and motor 50, a uniform linear velocity is imparted to medium 34 so as to produce a uniform correspondence between the space variations of magnetization along medium 34 and the time variations in the signal imparted to or taken from head 42, Figure 2.

The medium 34 is maintained taut between capstan 40 and device 32 by reason of the fact that the angular velocity which tends to be imparted to device 32 by reason of the action of belt 144 exceeds the angular velocity corresponding to the linear velocity imparted to medium 34 by capstan 40. Thus belt 144 slips and maintains medium 34 taut.

In the "forward" position of Figure 9, plate 88 swings about the center of eccentric 86 so as to cause disk 82 to engage the friction surface 102 of brake 100. This brake opposes rotation of disk 82 and rotation of device 30, thereby maintaining medium 34 taut as it is withdrawn from device 30 by the action of capstan 40.

The rotation of plate 88 further causes wiper 108 to bear against medium 34 and press it against head 42. This results from the action of arm 120 of plate 88 which swings against pin 116 to swing arm 114 in the clockwise direction about pin 112 as seen in Figure 11, thereby swinging arm 110 to a corresponding degree and causing the wiper pad 108 to bear against the head 42.

In the "forward" position of Figure 9 the arm 126 is free to swing so as to cause erase magnet 132 to bear against medium 34 and impart a uniform magnetization thereto during the recording operation. This uniform degree of magnetization is highly desirable in order that the intelligence corresponding to previous recordings on medium 34 or random "noise" imparted to that medium by reason of the magnetic history of the materials thereof, do not come through to distort the new recording. This motion of arm 126 is made possible by reason of the fact that when plate 88 rotates to the position of Figure 9, the lip 138 is rotated to a position where it does not engage pin 136 of arm 134.

The electrical circuits

The electrical circuits of the embodiment of our invention shown and described herein are shown in the schematic diagram of Figure 12. In this diagram switches and other components previously described are identified by like reference numerals. Alternating power to the equipment is supplied from terminals 240 and 242 which are connected to a source of alternating voltage. The application of this power is controlled by switch 244 which is attached to volume control rheostat 246 to switch the unit off when the volume control is turned down to zero. In addition, a separate switch 248 is provided selectively to energize motor 50 so as to provide independent control of the operation thereof. The power from the alternating voltage source is applied to transformer 250 which includes a plurality of low voltage windings 252 to energize the heater circuits of the various electron discharge devices used in the equipment and a high voltage winding 254 to provide the necessary high voltage for the cathode-anode space paths. The terminals x—x of one winding 252 are connected to the terminals x—x of the heaters of the various electron discharge devices. Winding 254 is connected to the full wave rectifier and filter circuit shown generally at 256 so as to produce at points 258 and 260 a unidirectional voltage of substantially constant value for application for the cathode-anode space paths of the various electron discharge devices used in the equipment.

The operation of the electrical portions of our invention can best be understood by considering first the various component elements when the switch 248 is rotated to the "listen" position by swinging arm 126 to the position shown in Figure 2. The various component switches 131a, 131b, etc., are then positioned as shown in the solid lines of Figure 12. In this case, passage of medium 34 over head 42 produces a time varying voltage in winding 48 of head 42, Figure 2, corresponding to the variations in the magnetization of medium 34 along its length. This voltage is applied through switch 131b to the primary winding of transformer 262 which converts the voltage to a value suitable for application to the control electrode of the first section of electron discharge device 264 which forms part of the two stage amplifier shown generally at 266. By reason of the amplifying action of amplifier 266, the time varying voltage induced in the coil 48 appears as a time varying current flow in resistance 268 so as to apply a corresponding time varying voltage to volume control potentiometer 246 through the filter network shown generally at 270.

The filter network 270 acts as an "equalizer" to compensate for the constant current recording characteristic of the recording head and the recording medium. This characteristic causes approximately six decibels per octave rise in response up to a cut-off point and to secure a good fidelity of reproduction it is highly desirable to compensate for this uneven characteristic by a suitable electrical filter or "equalizer" network. Resistance 272 acts as a tone control to vary the effect of equalizer 270, thereby varying the frequency response of the equipment and enabling selective exaggeration of either high frequency or low frequency components of the reproduced signal.

Potentiometer 246 acts as a volume control to apply a greater or lesser voltage to the control electrode of the first section of electron discharge device 274 which forms part of the two stage amplifier shown generally at 276. This amplifier produces two time varying voltages 180° out of phase for application to the push-pull amplifier shown generally at 278 and which utilizes electron discharge devices 280 and 282. Cathode-anode space current for devices 280 and 282 flows through the primary winding of transformer 284 so that a time varying voltage is produced in the secondary winding 286 thereof which varies in accord with the intelligence. This voltage is applied to the loud speaker shown generally at 288 or, if desired, to an external reproducing device through jack 290.

It is thus evident that when arm 126 is rotated to the "listen" position wherein switch 131 is rotated to the position of the solid lines of Figure 12 the electrical circuits act to amplify the time varying voltage induced in coil 48 in accordance with the variations in magnetization along the length of medium 34 so as to produce at speaker 288 a time varying signal corresponding to the time varying signal recorded upon medium 34.

The above description of the electrical circuit applies to the situation wherein knob 220 is rotated to the "forward" position and arm 126 is in the "listen" position. In this case, switch 234 is closed and no current flows through resistance 294. If knob 220 is rotated to the "rewind" position so that medium 34 is drawn from device 32 to device 30 at the high velocity corresponding to rewind, switch 234 is opened by reason of the previously described engagement between pin 230 of plate 88 and arm 232 of switch 234 as shown in Figure 8. In this case, resistance 294 is in series connection with the secondary winding 286 of transformer 284 and accordingly reduces the current flow in speaker 288 to reduce the volume of the "reverse" recording heard upon rewind to a small pleasant value only sufficient to indicate to the operator that rewinding is in progress.

For the recording operation, arm 126 is shifted to cause erase magnet 132 to bear against medium 34 and to rotate switch 131 to the position shown in the dotted lines of Figure 12. In this condition, dial 220 must be in the "forward" position because, as previously described, plate 88 prevents shifting of arm 126 to the "record" position when dial 220 is in any other position. With switch 131 in the position of the dashed lines of Figure 12, jack 296 is connected to the control electrode of the first section of electron discharge device 264 and a suitable signal to be recorded, as for example, a time varying voltage corresponding to music or speech, may be applied through this jack. In one method of accomplishing this purpose, a microphone (not shown) may be connected to jack 296. The voltage applied to the control electrode of device 264 is amplified by reason of the action of that device in conjunction with the amplifier shown generally at 266 so as to apply to equalizer 270 a time varying voltage corresponding to the intelligence to be recorded. This voltage is applied from equalizer 270 to potentiometer 246 which acts as a volume control to select the level of recording and apply the resultant voltage of the control electrode of the first section of device 274. The resultant output voltages from the amplifier 276 are applied to the two electron discharge devices 280 and 282 comprising amplifier 278 to cause current flow in the primary winding of transformer 284 varying in accord with the signal to be recorded. This current flow causes corresponding voltage to be induced in the secondary winding 286 of transformer 284, thereby applying voltage through switch 131e and resistance 298 to the winding 48 of head 42. The resulting current flow causes the magnetic field of head 42 to vary in accord with the time varying voltage applied to the control electrode of device 264 from jack 296. Since the medium 34 is drawn across head 42 at a uniform linear velocity and a constant degree of magnetization is imparted thereto by reason of the action of erase magnet 132, variations in the magnetization in the medium 34 are imparted along its length in accord with the time variations of the signal applied to the control electrode of the first section of device 264 and a recording suitable for later reproduction is produced.

It is the function of the oscillator shown generally at 300 to generate a high frequency voltage for simultaneous application to winding 48 with the voltage corresponding to the signal to be recorded. This oscillator operates at a frequency of approximately 18 kilocycles determined principally by the natural resonant frequency of the inductor 304 in conjunction with the capacitor 306 and utilizes the conventional Hartley circuit wherein positive feedback is achieved by connecting a tap on inductor 304 to the cathode of device 302 and the opposite ends of inductor 304 to the control electrode and anode of device 302 respectively. Space path voltage for device 302 is derived from switch 131a and inductor 304. Winding 308 is in inductive relationship with inductor 304 so that an 18 kilocycle voltage is imparted to that winding and applied through switch 131b to one section of winding 48 of head 42.

In accordance with the well known laws governing magnetic recording, the application of a high frequency voltage to head 42 simultaneously with the time varying signal voltage prevents the nonlinearity of recording otherwise associated with the curvature of the B-H curve of the magnetic medium 34 near the region of zero flux density. This high frequency bias voltage does not appear during the playback or "listen" operation because of the filter action inherent in the electrical circuits, together with the inability of the speaker 288 to reproduce such frequencies and the human ear to detect them.

It is the function of neon lamp 310 to indicate when volume control 246 is properly adjusted for recording. To this end, lamp 310 is connected to point 258 through the voltage divider comprising potentiometer 312, resistance 314 and resistance 316 and to the anode of electron discharge device 280 through capacitor 318. The junction of lamp 310 and capacitor 318 is connected to ground through resistance 320. When potentiometer 312 is properly adjusted, neon lamp 310 just fires when the combined voltage associated with the time varying voltage appearing at the anode of device 280 and the unidirectional voltage derived from point 258 are of predetermined value corresponding to the optimum level of recording on medium 34. Thus the lamp 310 acts as a means of properly adjusting the degree of magnetization imparted to the medium in accord with the signal to be recorded and prevents either undermagnetization or overmagnetization.

Lamps 249 and 273 are selectively energized from winding 252 by switch 131f to provide an indication of whether the mechanism is recording or reproducing. These lamps are mounted on the front panel 22, Figure 1.

Jack 292 permits insertion of a signal directly to equalizer network 270 during the recording operation so as to permit use of the unit with a relatively high level source of signals. Such a source might, for example, be the "phono" connection of a conventional radio receiver.

While we have shown a particular embodiment of our invention, it will, of course, be understood that we do not wish to be limited thereto since many modifications, both in the mechanical and electrical structures disclosed and the arrangement of the elements shown, may be made without departing from the spirit and scope thereof. We, of course, contemplate by the appended claims to cover any such modifications as fall within the true spirit and scope of our invention.

What we claim as new and desire to secure by Letters Patent in the United States is:

1. In a device to vary a condition of a medium in accord with an intelligence, a magnetic transducer head to impart a controlled degree of said condition to an incremental length of said medium in accord with the time variations in said intelligence, a single drive for said intelligence conditioning device operable in one condition to cause travel of said medium across said head in a predetermined direction and in another condition to impart no travel to said medium, an erasing device movable independently of said head and operable in a first condition to erase intelligence or noise from said medium before it reaches said head when traveling in said predetermined direction and in a second condition

17 to have no effect on the said condition of said medium, and elements interconnecting said erasing device and said drive to shift said erasing device from said first condition to said second condition when said drive is changed from said one condition to said other condition, whereby accidental erasure of said medium is prevented.

2. In a device to vary a condition of a medium in accord with an intelligence, a magnetic transducer head to impart a controlled degree of said condition to an incremental length of said medium in accord with the time variations of said intelligence, a reversible drive to cause travel of said medium across said head, a device movable independently of said head and operable in a first condition to erase intelligence or noise from said medium before it reaches said head when traveling in a predetermined direction across said head and in a second condition to have no effect on said condition of said medium, and elements interconnecting said device and said drive to fixedly shift said device from said first condition to said second condition when said drive is reversed to cause said medium to travel across said head in direction opposite said predetermined direction, whereby accidental erasure of said medium is prevented.

3. In a device to vary a condition of a medium in accord with an intelligence, a head to impart a controlled degree of said condition to an incremental length of said medium in accord with the time variations in said intelligence, a drive selectively operable to a forward position to cause travel of said medium in one direction across said head, a reverse position to cause travel of said medium in the opposite direction across said head, or a stop position to cause no travel of said medium, mechanism to control said drive, said mechanism including interlinked elements to prevent transfer of said drive from said forward position to said reverse position without first going through said stop position, a device shiftable independently of said head operable in a first condition to erase intelligence or noise from said medium before it reaches said head when traveling in said forward direction and in a second condition to have no effect on said condition of said medium, and mechanism interconnecting said device and said first mechanism to fixedly shift said device from said first condition to said second condition when said drive is changed from said forward position to said stop position in which condition said device is arranged to be retained until independently shifted, whereby accidental erasure of said medium is prevented.

4. In a recorder for imparting a varying degree of magnetization to a lengthy medium, a first medium supporting device, a second medium supporting device, a medium wound on said devices and transferable therebetween by rotation thereof, a head disposed to be traversed by said medium, means to control said head so as to impart a varying degree of magnetization to said medium as it passes thereover, a magnet, a shiftable pivoted support for said magnet so that it may be moved independently of said head to an engaged or a fixed retracted position relative to said medium, said magnet in the engaged position being disposed to bear on said medium at a point between said first device and said head, a reversible drive to transfer said medium between said devices, and interconnecting elements to shift said magnet fixedly to said retracted position when said drive transfers said medium from said second device to said first device, said magnet

18 being so associated with said head control means as to be shifted into engagement with said medium only when said control means is operated to impart magnetization to said medium.

5. In a recorder for imparting a varying degree of magnetization to a lengthy medium, a first medium supporting device, a second medium supporting device, a medium wound on said devices and transferable therebetween by rotation thereof, a head disposed to be traversed by said medium, means to control said head so as to impart a varying degree of magnetization to said medium as it passes thereover, a magnet, a shiftable pivoted support for said magnet so that it may be moved independently of said head to a fixed engaged or a retracted position of rest relative to said medium, said magnet in the engaged position being disposed to bear on said medium at a point between said first device and said head, a reversible drive to transfer said medium, a control for said drive having a first position wherein said medium is caused to travel in one direction between said devices, a second position wherein said medium is caused to travel in the other direction between said devices and an intermediate position wherein said drive is stopped, and interconnections between said control and said magnet to shift said magnet to the retracted position when said control is shifted to said stop position and to hold said magnet in said retracted position when said control is in said reverse position in which position said magnet is arranged to be retained when said control is shifted to said first position.

6. In a magnetic recording and reproducing equipment, a head shaped to define a path for magnetic flux and having a winding linking said path, mechanism including a switch selectively operable to impart current flow to said winding in accord with an intelligence or to reproduce as an intelligence the variations in the magnetic flux of said path, a lengthy magnetizable medium, means to cause travel of said medium in a controllable direction across said head at a point wherein said medium forms part of said flux path, an erase magnet, a shiftable mounting means for said magnet disposed so that said magnet may be shifted independently of said head to an operating position where said magnet is near said medium and on one side of said head or to retracted position where said magnet is spaced from said medium, and elements interconnecting said switch and said mounting so that said magnet is shifted to said operating position only when said mechanism is operated to impart current flow to said winding, and devices interconnecting said means and said magnet to shift said magnet to said retracted position when said medium travels from said head to said erase device.

7. In a magnetic recording and reproducing system, a head having elements shaped to define a path for magnetic flux and a winding disposed to link said path, a lengthy magnetizable medium, means to support said medium against said head so that said medium forms part of said flux path, reversible mechanism selectively operable to stop or to cause travel of said medium across said head, means including a switch selectively operable to impart current flow to said winding in accord with an intelligence or to reproduce as an intelligence the variations of magnetic flux of said path, pivotal support means, an erase device carried by said pivotal support means and shiftable independently of said head to an operating position against said medium or shiftable to a set retracted position of rest spaced from said medium, means interconnecting said erase device and said switch so that said erase device assumes said operating position only when said switch is adjusted to cause current flow in said winding, said reversible mechanism including elements to shift said erase device to said set retracted position of rest when said mechanism is stopped and to prevent shifting of said erase device to its operating position when said mechanism is either in the stop or reverse condition, whereby accidental erasure of said medium is prevented.

8. In a magnetic recording and reproducing system, a head having elements shaped to define a path for magnetic flux and a winding disposed to link said path, a lengthy magnetizable medium, means to support said medium against said head so that said medium forms part of said flux path, mechanism selectively operable to stop or to draw said medium across said head in either direction, a control device to control said mechanism having a forward position wherein said medium travels in a first direction, a reverse position wherein said medium travels in the opposite direction, and an intermediate stop position wherein said medium does not travel, means including a switch selectively operable to impart current flow to said winding in accord with an intelligence or to reproduce as an intelligence the variations of magnetic flux of said path, pivotal support means, an erase device carried by said pivotal support means and shiftable independently of said head to an operating position against said medium or a set retracted position of rest spaced from said medium, means interconnecting said erase head and said switch so that said erase device assumes said first position only when said switch is adjusted to cause current flow in said winding, said reversible mechanism including elements to shift said erase device to said set retracted position of rest when said control device is shifted from said forward position to said stop position and to prevent shifting of said erase magnet when said control device is in said stop position or the said reverse position, whereby accidental erasure of said medium is prevented.

9. In a device of the type wherein a magnetizable medium is drawn in a forward direction across a stationary head having a coil and a magnetic flux path to record or reproduce intelligence, said medium forming part of said flux path, reversible drive means to cause said medium to travel across said head, a device urging said medium against said head to assure a uniform relationship therebetween, said device comprising a wiper yieldably supported to urge said medium against said head, and interconnecting elements between said wiper and said drive means to retract said wiper to permit said medium to travel free of said wiper in the reverse direction.

10. In a magnetic translating device, a stationary head having a coil and a flux path, a lengthy magnetizable medium disposed to form part of said flux path, mechanism to impart velocity to said medium, said mechanism including shiftable elements controlling the direction of travel thereof, a wiper, mechanism supporting said wiper, said mechanism being shiftable to a retracted position wherein said wiper is spaced from said medium or an operating position where said wiper engages said medium to urge it against said head, said last mechanism being engageable with said shiftable elements to retract said wiper when said medium travels in one direction over said head.

11. A magnetic recording and reproducing device including in combination on a pair of medium supporting devices, a medium wound about said support devices to be transferable therebetween by rotation thereof, shiftable elements selectively operable to brake one of said support devices, to rotate said one device in the wind direction, or to release said one device for rotation, shiftable elements selectively operable to brake the other of said support devices or to rotate said other device in the wind direction, a recording and reproducing head disposed to be traversed by said medium as it travels between said support devices, means connected to said head and having a switch operable in one position to cause said means to vary the magnetic field about said head in accord with an intelligence and in another position to cause said means to reproduce a signal varying with time in accord wth the magnetization of said medium as it travels over said head, an erase head, a support means for said erase head interconnected with said switch so that said erase head bears against said medium in the region between said other medium support device and said head when said switch is in said one position and said erase head is in a retracted position away from said medium when said switch is in said other position, a control device to adjust said shiftable elements, said control device having a first position of operation wherein said other support device is rotated and said one support device is braked, a second position of operation wherein said one support device is rotated and said other support device is released for rotation, and an intermediate position wherein said other support device is braked, and mechanisms interconnecting said control device with said switch so that when said control device is moved from said first position to said second position, said switch is moved to said other position, and when said control device is in said second position or said intermediate position, said switch is blocked against movement to said one position.

HUGH A. HOWELL.
ELMER B. OFFUTT.

References Cited in the file of this patent

UNITED STATES PATENTS

| Number | Name | Date |
|---|---|---|
| 1,142,384 | Liffany | June 8, 1915 |
| 1,170,216 | Blanch | Feb. 1, 1916 |
| 1,844,224 | Klappenacker | Feb. 9, 1932 |
| 2,086,130 | Hichman | July 6, 1937 |
| 2,089,287 | Malloy | Aug. 10, 1937 |
| 2,328,539 | Greenleaf | Sept. 7, 1943 |
| 2,351,003 | Camras | June 13, 1944 |
| 2,351,005 | Camras | June 13, 1944 |
| 2,351,007 | Camras | June 13, 1944 |
| 2,418,542 | Camras | Apr. 8, 1947 |
| 2,467,507 | Stone | Apr. 13, 1949 |
| 2,495,125 | Nemeth | Jan. 17, 1950 |
| 2,538,892 | Begun | Jan. 23, 1951 |

FOREIGN PATENTS

| Number | Country | Date |
|---|---|---|
| 172,296 | Great Britain | Feb. 26, 1923 |
| 459,035 | Great Britain | Dec. 31, 1936 |